(12) United States Patent
Alfredsson et al.

(10) Patent No.: US 7,161,500 B2
(45) Date of Patent: Jan. 9, 2007

(54) DISPLAY DEVICE FOR AIRCRAFT AND METHOD FOR DISPLAYING DETECTED THREATS

(75) Inventors: Jens Alfredsson, Linköping (SE); Tomas Rosenblad, Vällingby (SE); Örian Skinnars, Rimforsa (SE)

(73) Assignee: SAAB AB, Linkoping (SE)

( * ) Notice: Subject to any disclaimer, the term of this patent is extended or adjusted under 35 U.S.C. 154(b) by 607 days.

(21) Appl. No.: 10/476,893

(22) PCT Filed: May 3, 2002

(86) PCT No.: PCT/SE02/00855

§ 371 (c)(1),
(2), (4) Date: Nov. 6, 2003

(87) PCT Pub. No.: WO02/090890

PCT Pub. Date: Nov. 14, 2002

(65) Prior Publication Data

US 2004/0140912 A1   Jul. 22, 2004

(30) Foreign Application Priority Data

May 10, 2001   (SE)   .................................... 0101674

(51) Int. Cl.
*G08G 5/04* (2006.01)
(52) U.S. Cl. .................... 340/961; 340/963; 701/14; 701/301

(58) Field of Classification Search ................ 340/961, 340/963, 971, 980, 973, 974, 975; 701/3, 701/9, 14, 301, 120
See application file for complete search history.

(56) References Cited

U.S. PATENT DOCUMENTS

| 3,846,746 | A | * | 11/1974 | Trageser et al. ............. 340/961 |
| 4,835,537 | A | * | 5/1989 | Manion ....................... 342/30 |
| 4,914,733 | A | | 4/1990 | Gralnick ..................... 340/961 |
| 5,459,666 | A | | 10/1995 | Casper et al. ................ 340/973 |
| 5,506,587 | A | | 4/1996 | Lans .......................... 342/386 |
| 6,473,003 | B1 | * | 10/2002 | Horvath et al. ............. 340/945 |

FOREIGN PATENT DOCUMENTS

| DE | 198 12 037 | 9/1999 |
| EP | 0 396 071 | 11/1990 |
| SE | 9903965-3 | 5/2001 |
| WO | 01/33506 | 5/2001 |
| WO | 01/39127 | 5/2001 |

* cited by examiner

*Primary Examiner*—Brent A. Swarthout
(74) *Attorney, Agent, or Firm*—Bingham McCutchen LLP

(57) ABSTRACT

This invention concerns a display device for aircraft comprising a display surface (15) that has a punctual marking (11) arranged so as to represent the pilot's own airplane and one or more threat markings, each of which is arranged so as to represent a direction to an associated detected threat. The display device is characterized in that each threat marking comprise an indicator (14, 15) that contains information about the time to the associated threat, and in that it is arranged so as to present, on a display surface (15), a current time discrepancy relative to a planned mission and a remaining amount of fuel relative to the planned mission. The invention also concerns a method for presenting one or more detected threats in relation to an aircraft.

11 Claims, 3 Drawing Sheets

DISPLAY DEVICE FOR AIRCRAFT AND METHOD FOR DISPLAYING DETECTED THREATS

TECHNICAL AREA

This invention concerns a display device for aircraft according to the preamble to claim 1.

The invention also concerns a method for displaying one or more detected threats in relation to an aircraft according to the preamble to claim 1.

STATE OF THE ART

Pilots of civil airplane have previously been dependent on to certain degree of visual contact with nearby airplanes, advice from ground-based traffic control stations to avoid collisions in the airspace, and on sensors (e.g. radar) carried in the airplane. However, systems exist today that include transponders that can be implemented in airplanes, and which can aid in the pilot in obtaining information concerning the positions of nearby passing airplane in relation to the pilot's own airplane. These transponders periodically send out query signals into the surrounding airspace. The transponders of nearby airplanes are arranged so as to respond to said query signals by emitting a response signal containing information about the altitude of said nearby airplanes. The querying transponder receives the response signal and measures the time that has elapsed between the transmission of the query signal and the reception of the response signal. Based on the information in the response signal and the measured time, data such as the altitude and rate of climb/descent of the nearby airplane are calculated, as are its range and changes in the range to the nearby airplane.

U.S. Pat. No. 4,914,733 concerns an instrument in an airplane cockpit, which instrument is arranged so as to present the calculated data and is intended for use as a decision-making aid for the pilot of the airplane. The instrument includes a display in which the center of the display surface represents the position of the pilot's own airplane. Surrounding airplanes are presented on the display as symbols positioned relative to the center of the display surface in such a way that the direction of and distance between the pilot's own airplane and the surrounding airplanes are made clear. The symbols for the surrounding airplanes are realized differently based on a characterization of each airplane that is in turn based on the aforedescribed calculated data, so that a first symbol type represents a non-threatening airplane, a second symbol type represents a potentially threatening airplane and a third symbol type represents a threatening airplane that requires that the pilot take steps to avoid a collision. An indication generated by the airplane equipment as to what action is appropriate for the pilot to take (e.g. CLIMB, DESCEND, DO NOT CLIMB, DO NOT DESCEND) is associated with the symbol for a threatening plane.

U.S. Pat. No. 5,506,587 describes a more modern transponder system.

The transponder systems described in U.S. Pat. No. 4,914,733 and U.S. Pat. No. 5,506,587 are not adequate for military applications, where the threat may consist of, e.g. a hostile airplane. Such hostile airplanes will seek to conceal their existence/identity, and are not interested in giving their position, which is indeed the underlying basis of the transponder system. Furthermore, the range information provided by the instrument provides far too limited decision-making support for military applications.

In addition to being equipped with transponder systems, military airplanes are also equipped with some type or types of sensor system to determine position/direction of one or more threats, and also to identify these threats. These sensor systems can be designed in a number of different ways.

A first type of sensor system is based on radar, wherein the pilot's own plane emits radar signals and receives reflected radar signals and, based on the properties of the received signals, determines the range and direction of the object from which the radar signals are being reflected. In addition, different types of airplane have different radar signatures, thereby enabling their identification. Identifying an airplane type from the radar signature of an object also makes it possible to make assumptions as to the types of weapons with which the plane is armed.

A second type of sensor system includes radar interception receivers that passively "listen" for radar signals to which the pilot's own plane is exposed. Based on the properties of the received radar signals, it is possible to make an assumption as to the type of radar from which the signals are being received. Based on this information, it is then possible to say with some degree of probability which weapon system is engaged. Based on a knowledge of the weapon system in question, it is then further possible to assume the weapon type and performance with some degree of probability. A third type of sensor system comprises different types of IR sensors, such as IRST (InfraRed Search and Track). A fourth type of sensor system is based on transponder technology in which position and identity information are obtained from interactive IFF equipment and communications links. A fifth type of sensor system is based on an information exchange, e.g. position and identity information is communicated between airplane via links. A sixth type of sensor system is based on information exchanges between airplanes and tactical control via links. All these types of sensor systems, and others, can interact in a multi-sensor system in order to increase the precision of the input measurements.

SUMMARY OF THE INVENTION

The invention is intended to provide a concentrated overall presentation of selected threats that have been, e.g. detected/identified via a. sensor system arranged on an aircraft.

This has been achieved by means of a display device for aircraft comprising a display surface that presents a symbol comprising of an outer edge surrounding a symbol center, wherein the symbol center marks the airplane and where one or more threat markings are positioned in relation to the outer edge in such a way that each of them indicates a direction to an associated detected threat. The display device is characterized in that each threat marking comprises an indicator that extends from the outer edge toward the symbol center and whose length is chosen so that the distance between the end of the indicator and the symbol center represents a predicted time until it is estimated that the pilot's own airplane will reach the threat represented by the respective threat marking, and in that the display device is arranged so that the display surface presents a current time discrepancy relative to a planned mission, and the amount of fuel left in relation to the planned mission.

The threat characteristically represents a threat zone surrounded by a threat boundary, wherein the pilot's own airplane is assumed to reach the threat when the threat boundary is transgressed. The threat may consist of, e.g.:

an airplane that is on a course toward the pilot's own aircraft, a weapon on an airplane that is located within the effective range of said weapon, the effective range of ground or sea-based antiaircraft systems, or a solid object in the form of a building, mast or rock wall.

The aircraft is, e.g. a military airplane, primarily an attack or reconnaissance airplane. The planned mission may be a mission that has been planned in detail with breakpoints, and with precisely planned altitudes and speeds for each subsection between two breakpoints. The mission is thus divided into a number of continuous subsections that together form a polygon in which each section has its own associated altitude and speed. During the performance of a such a mission, the information presented by the display means is the very information that the pilot needs in order to make quick decision as to how he/she should act vis-a-vis the various problems that can arise in the form of the types of threats described above, or "internal" threats in the form of delays related to a timetable or shortage of fuel. The aforedescribed threats and internal threats are the factors that limit the pilot's freedom of action in connection with decision-making. These factors are also covariant. This means: that, for example, if the pilot increases speed to keep to the timetable, this will lead to increased fuel use, which could in turn mean that there will not be enough fuel for the planned mission, insofar as the fuel supply is not very good in relation to the mission. In another example where the pilot is planning to change the planned mission (replanning) by taking an alternate flight path to circumvent an external threat, the display device will provide the information that the pilot needs to make a quick and correct decision, i.e. the display device will indicate whether the timetable and fuel status permit such an evasive maneuver. It is thus extremely advantageous to display, along with directions to threats, the time until the threat, the time available to complete the mission in relation to the timetable, and the fuel status in relation to the planned mission.

The aircraft has been described above as an airplane, in which case the display device is arranged in connection with the cockpit instrumentation. In an alternative embodiment in which the aircraft is unmanned, the display device is not arranged in connection with the aircraft, but rather deployed in, e.g. a ground-based station that is in contact with the aircraft.

Preferred embodiments exhibit one or more of the characteristic features specified in subordinate claims 2–10.

The invention also includes a method for displaying one or more detected threats in relation to an aircraft, wherein each and every one of the detected threats is represented by a threat marking on a display surface, and wherein the aircraft is placed at a center surrounding by an outer edge, and wherein a direction to each threat is designated by the location of the associated threat marking relative to the outer edge. Each threat marking is represented by an indicator that extends from the outer edge toward the symbol center, whereupon the length of the indicator is chosen so that the distance between the end of the indicator and the symbol center represents the time left until the associated threat is reached. A current time discrepancy relative to a planned mission is presented on the display surface, as is the amount of fuel left in relation to the planned mission.

PREFERRED EMBODIMENTS

Figure 1:
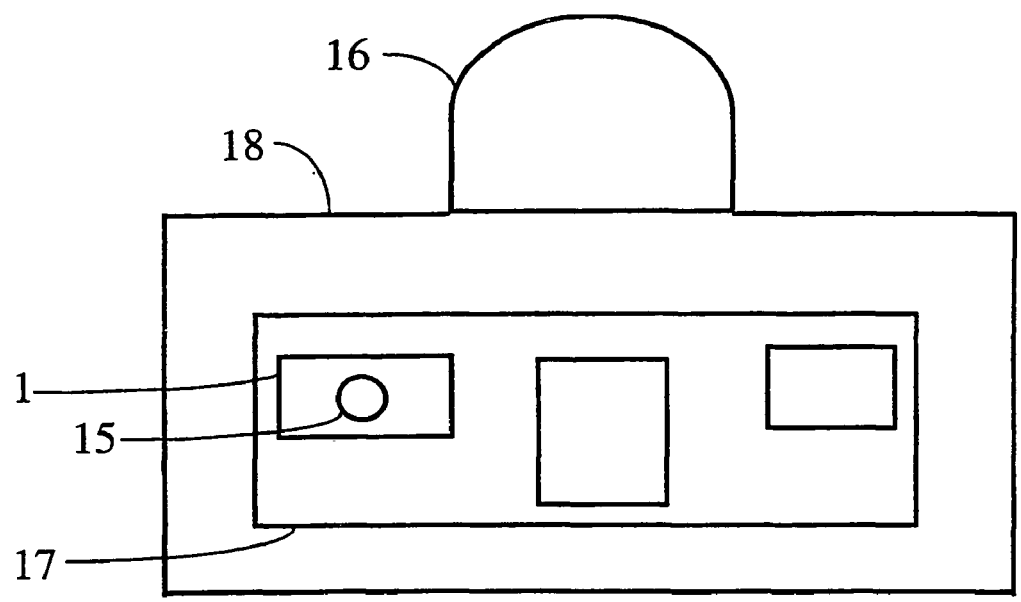
FIG. 1 shows an example of an airplane cockpit with an instrument according to the invention.

In FIG. 1, reference number 1 designates a device placed in a cockpit of, e.g. a military attack airplane. The device 1 has a display surfaced 15 realized using, e.g. LCD, CRT or VRD technology and installed, e.g. inside the front windshield of the cockpit in a so-called head-up 16, or in a so-called head-down display 17. In the embodiment shown in the figure, the head-down display 17 and the head-up display 16 have been installed in a panel 18, and the device 1 is included in the head-down display 17. The display surface 15 may alternatively be integrated with the airplane pilot's helmet (VRD technology). The device 1 is intended to display information via the display surface 15 for use as a decision-making aid during combat missions.

Figure 2:
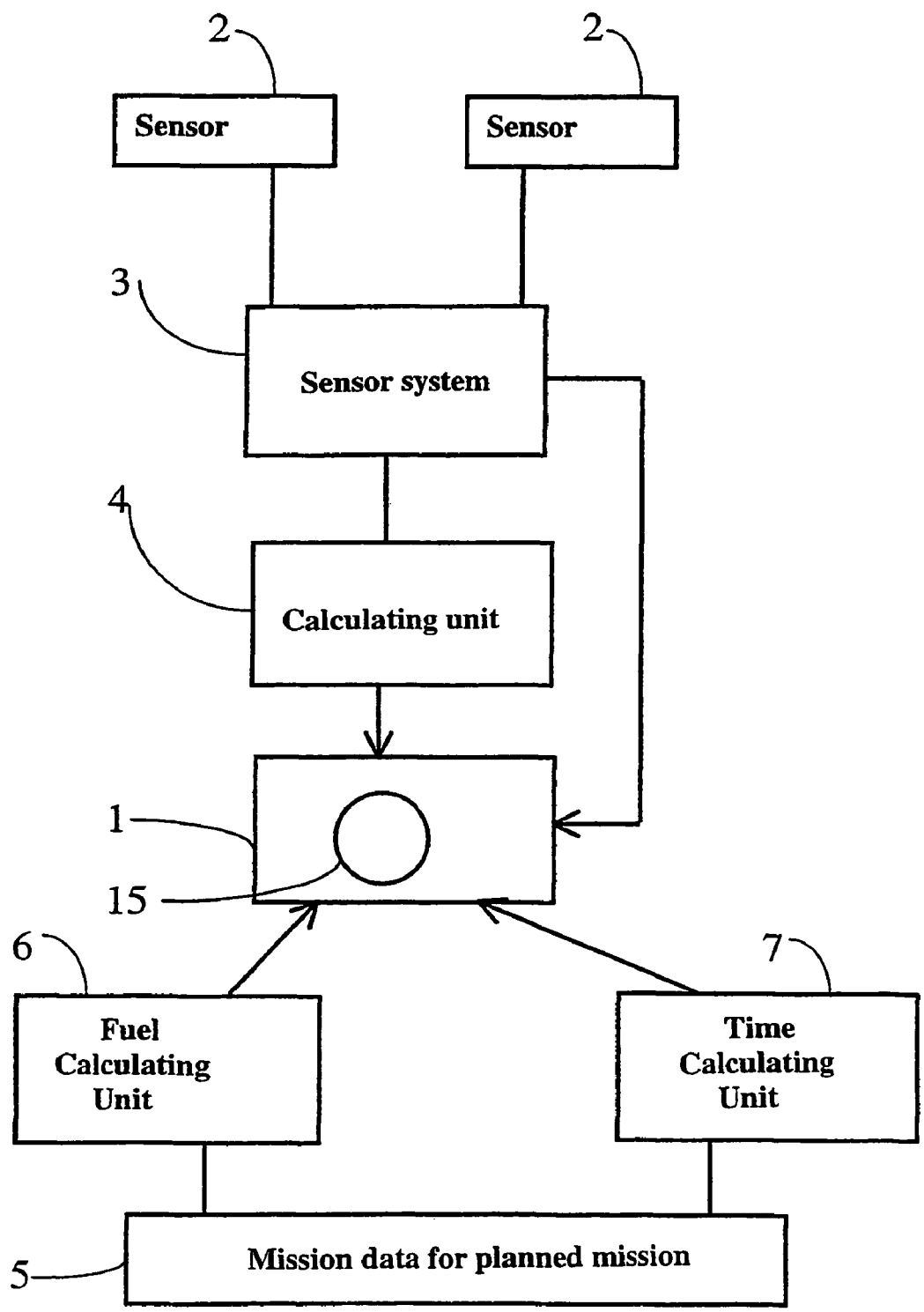
FIG. 2 shows an example of a system solution with an instrument according to the invention.

In FIG. 2, reference number 5 designates a unit in which a mission that has been planned in detail is input and stored with altitudes, positions and speeds for the entire mission precisely planned. The mission is divided into, e.g. a number of continuous sections that together form a polygon in which each section has an associated altitude and speed.

The mission unit 5 is connected to a unit 6 that calculates fuel consumption for the completion of the planned mission in relation to the available fuel. From the airplane fuel system the fuel-calculating unit 6 has access to information as to how much fuel is left. Together with information available from the mission unit 5 and the fuel system, the unit 6 calculates how much fuel is expected to be needed for the remainder of the mission, and compares the expected fuel consumption with the actual supply to generate a value ΔF that indicates the difference between the expected consumption and the actual supply.

The mission unit 5 is further connected to a unit 7 that determines the current time status of the pilot's own airplane in relation to a timetable for the planned mission. The timetable is calculated using mission data input into the mission unit 5. In a simple embodiment the unit 7 retrieves the position of the pilot's plane via a navigation system (not shown) included in the plane, compares the expected position specified in the mission with the actual position provided by the navigation system and calculates how much time it will take to travel between the actual position of the airplane and the expected position, based on the flight altitudes and airspeeds entered for the mission, in order to generate a value ΔT that indicates the time difference between the expected position according to the schedule for the mission, and the actual position. The navigation system may comprise inertial navigation, GPS, air data, sensors, etc., and is arranged so as to indicate the position, altitude, direction of flight and attitude of the plan relative to a defined coordinate system. In one example the mission unit 5 is connected to a diskette unit connected to a computer, wherein the mission is stored on a diskette. In this example the computer contains the units 6 and 7 and is equipped with an, interface to receive the necessary information from the fuel system and navigation system of the airplane.

Reference number 2 designates sensors connected to a sensor system 3 for detecting, determining the position of and identifying threats. We have noted above that such sensor systems can be radar-based, radar interception receiver-based, tactical control-based, link-based or IR-based, and that they provide position/direction and identity information for each detected threat. We will not describe such a sensor system in detail here, but simply assume its existence.

The sensor system 3 is connected to a calculating unit 4 for determining threat boundaries based on the identified threats, and for calculating times until these threat boundaries will be reached. An identity in the form of, e.g. a number and/or letter combination is assigned to each threat. If a threat is unidentified, then only the direction to the threat can be displayed. The calculating unit 4 will then calculate, based on the determined threat boundaries, the time until the pilot's own plane will reach the respective threat boundary, based on the current speed and direction the pilot's own plane.

From the calculating unit 6 the device 1 retrieves the difference $\Delta F$ between the expected fuel consumption for the remainder of the mission and the actual fuel supply. From the time-calculating unit 7 the device 1 retrieves the difference $\Delta T$ that indicates the extent to which the flight is ahead of or behind the timetable for the planned mission. From the sensor system 3 the device 1 retrieves the direction to each and every one of the threats and, from the calculating unit 4, the estimated time until the pilot's own plane will reach the threat boundary of the threat zone that each threat represents. The device 1 presents the retrieved information on the display surface 15 as described below.

Figure 3:
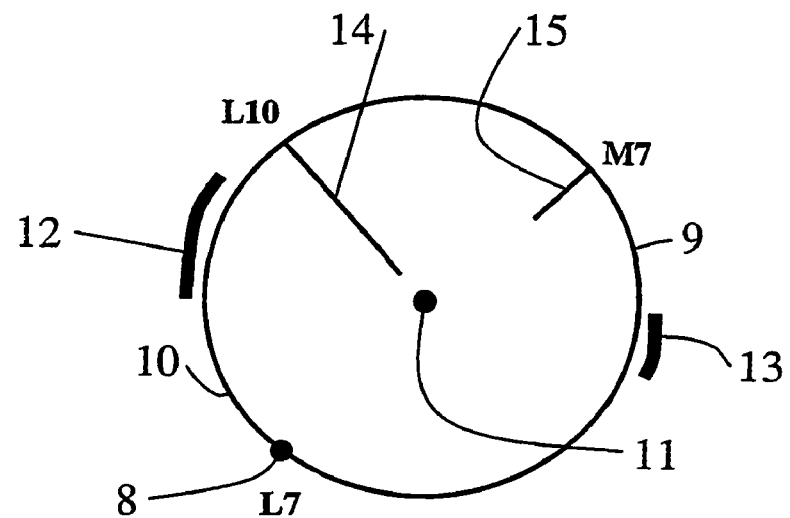
FIG. 3 shows the instrument according to a first embodiment.

In FIG. 3 the instrument 1 is displaying a symbol 9 on its display surface, which symbol has an outer edge 10. The outer edge 10 is circular in the example shown, but examples in which the outer edge is elliptical, square or rectangular are also conceivable.

The center 11 of the circle 10 represents the position of the pilot's own airplane. Indicators 14, 15 extend from the edge of the circle 10 to the center 11. The locations on the circle edge from which the indicators start are controlled by the direction to the threat as determined by the sensor system 3, and represent a projection, in the horizontal plane, of the direction to the threat in relation to the direction of flight of the pilot's own plane. In the example shown in FIG. 3, the direction of flight of the pilot's own plane is straight up in the circle (0°). The distance between the center 11 and the end of each indicator represents the estimated time until the threat will be reached, which time is retrieved from the calculating unit 4. If the threat is approaching the pilot's own airplane, this will be obvious to the pilot in that the indicator will creep closer to the center of the circle, which of course represents the position of the pilot's own plane. If, on the other hand, the threat is withdrawing, this will also be obvious to the pilot of the plane, in that the indicator will shrink in length, whereupon its end will withdraw from the center of the circle. Note that these indicators provide a snapshot of the results furnished by the sensor system 3 and the calculating unit 4. If, for example, the sensor system 3 re-identifies a threat after a period of time, its threat boundaries will be affected instantaneously, as will the length of its associated indicator. In FIG. 3 each indicator 14, 15 is associated with an identity L10, M7, as described above. These identities tell the pilot which type of threat each of the indicators 14, 15 represents.

In one embodiment threats are marked based on the time until the threat boundary will exceed a pre-selected value on the circle edge at a point that corresponds to the direction of the threat. The pre-selected value thus indicates, in this embodiment, the maximum time interval, which will be represented by an indicator. In FIG. 3 such a threat is marked with a dot 8 and associated with an identity L7. In an alternative embodiment a specified number of threats are marked with an indicator 14, 15, while other threats are marked with a dot 8. For example, the 5, 8, 10 or 12 most urgent threats are marked with an indicator. In yet another alternative embodiment a priority reflecting a degree of "danger" is assigned to each type of threat. According to this embodiment, a pre-selected number of threats is marked with an indicator on the basis of their threat priorities. For example, the 5, 8, 10 or 12 highest priority or most dangerous threats are marked with an indicator 14, 15, while other threats are marked with, e.g. a dot 8. In yet another alternative embodiment each indicator 14, 15 contains information about the priority of its corresponding threat in that, e.g. the indicators are realized with different intensities.

In an alternative embodiment (not shown), each indicator extends from the center 11 toward the circle edge 10, and the distance between the end of the indicator and the edge 10 represents the estimated time to the threat.

Parallel with the circle edge 10 there runs a first curved bar 12 that indicates whether the flight is ahead of or behind the timetable for the input mission, as calculated by the calculating unit 7. When the $\Delta T$ value furnished by the calculating unit 7 indicates that the pilot is traveling faster than specified in the mission, the bar will extend upward along the edge of the circle from a zero position at 270°, as shown in FIG. 3. The length of the bar is proportional to the amount of time by which the flight is ahead of the timetable for the planned mission. If, on the other hand, the flight is behind the timetable for the mission, the bar will extend downward along the edge of the circle from the zero position at 270°. Here the length of the bar is proportional to the amount of time by which the flight is behind schedule. To further clarify the situation, the bar has a pre-selected first color when the pilot is ahead of the timetable specified for the mission, and a pre-selected second color when the pilot is behind schedule.

Along the edge of the circle there runs a second curved bar 13 that indicates whether the plane has an surplus or deficit of fuel in relation to the rest of the mission. The direction and length of this bar are thus determined by the value $\Delta F$ provided by the fuel-calculating unit 6. When there is a surplus of fuel, the bar 13 will extend upward relative to the index for the zero point along the edge of the circle from a zero position at 90%. The length of the bar is proportional to how much surplus fuel is available. If, on the other hand, the remaining fuel is not sufficient for the rest of the mission, as shown in FIG. 3, the bar 13 will extend down relative to the index for the zero point along the edge of the circle. The length of the bar will be proportional to the magnitude of the fuel deficit. To further clarify the situation, the bar has a pre-selected first color when there is a surplus of fuel, and a pre-selected second color when there is a fuel deficit.

Figure 4:
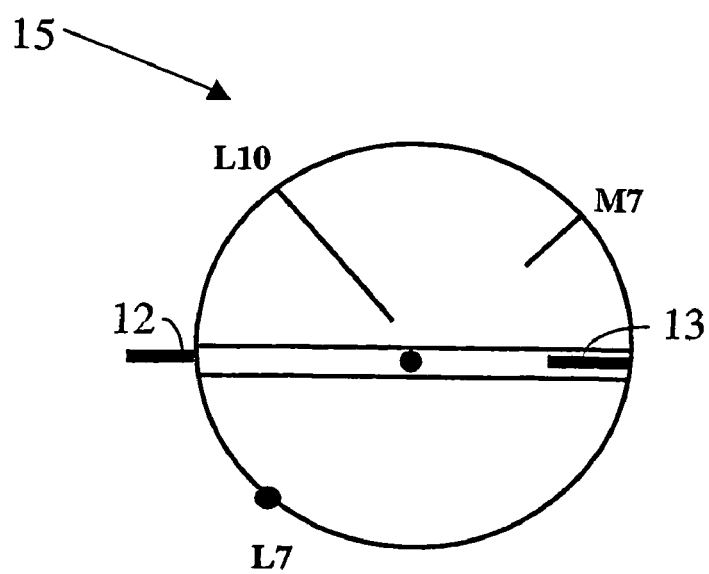
FIG. 4 shows the instrument according to a second embodiment.

The bars 12, 13 extend along the periphery of the circle 10 in FIG. 3. However, many other ways of representing time and fuel consumption in relation to the mission are conceivable. For instance, in FIG. 4 the first bar 12 has its zero point at the edge, at 270° in the figure, and extends toward the center when the time discrepancy is negative, i.e. the flight is behind the timetable for the planned mission, and in the opposite direction when the time discrepancy is positive. The second bar 13 also has its zero point on the edge, at 90° in the figure, and extends toward the center when the fuel is not sufficient to complete the entire mission, and in the opposite direction when there is surplus fuel. In this way the problem is presented to the pilot in a very clear manner, and the pilot can see by glancing quickly at the instrument 1 whether bars 12, 13 or indicators 14, 15 are present in the circle 10.

Figure 5:
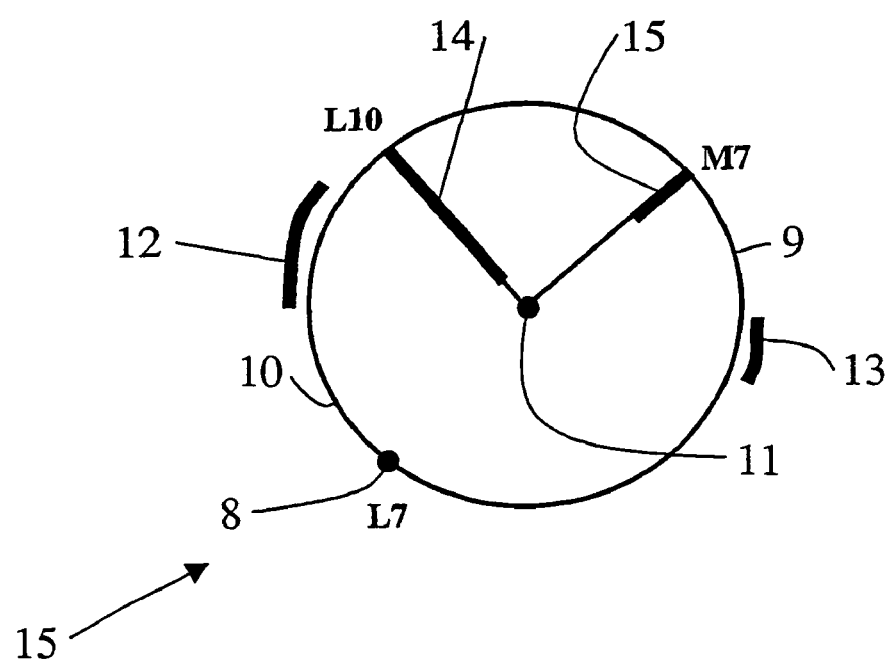
FIG. 5 shows the instrument according to a third embodiment.

The embodiment shown in FIG. 5 is equivalent to the embodiment shown in FIG. 3 except for the realization of the indicators 14, 15. In FIG. 5 each indicator extends all the way from the edge 10 to the center 11. The indicators are thicker along a portion of a length equivalent to the indicators described in connection with FIG. 3 than along the remainder of their length. In this way the distance between the center 11 and the end of each thick indicator portion represents the estimated time until the threat. If the threat is approaching the pilot's own airplane, this will be obvious to the pilot in that the thick portion of the indicator will creep closer to the center of the circle, which of course represents the position of the pilot's own airplane. If, on the other hand, the threat is withdrawing, this will also be obvious to the pilot of the airplane, in that the length of the thick portion of the indicator will shrink, whereupon the thick end will withdraw from the center of the circle. It will be apparent to one skilled in the art that an indicator that is divided into two portions, with one portion being a thick line and the remaining portion being a thin line, could be replaced by a differently realized divided indicator while retaining the same function. For example, the indicator could be two-colored.

We have described above a system comprising a number of units such as the calculating unit 4, the mission unit 5, the fuel-calculating unit 6 and the time-calculating unit 7. However, it must noted that these units need not necessarily be viewed as physically separable parts, and that they may constitute integral parts of a complex system. Each unit can use make use of stored values or values from other units. The ways in which these units are realized are not essential to the invention; the main issue is that they provide the data that the device 1 requires.

The invention claimed is:

1. A display device for aircraft comprising a display surface that presents a symbol comprising of an outer edge surrounding a symbol center, wherein the symbol center marks the aircraft and wherein one or more threat markings are positioned in relation to the outer edge in such a way that each of them indicates a direction to an associated detected threat, wherein:

each threat marking comprises an indicator that extends from the outer edge in the direction toward the symbol center and whose length is chosen so that the distance between the end of the indicator and the symbol center represents the time until the associated threat, and the display device is arranged so as to present, on a display surface, a current time discrepancy in relation to a planned mission and the amount of fuel left in relation to the planned mission.

2. A device according to claim 1, wherein only those threats for which the time to the threat is less than a pre-selected value are assigned an indicator.

3. A device according to claim 2, wherein the outer edge is placed at a distance from the symbol center that corresponds to said pre-selected value.

4. A device according to claim 3, wherein the outer edge is circular in shape.

5. A device according to claim 1, wherein the time discrepancy is presented in the form of a first bar whose length and direction depend on the current time discrepancy.

6. A device according to claim 5, wherein the first bar is placed outside of the symbol and extends along a portion thereof.

7. A device according to claim 5, wherein the first bar has its zero point at the outer edge and extends in toward the symbol center when the time discrepancy is negative, i.e. when the flight is behind a timetable for the planned mission, and in the opposite direction when the time discrepancy is positive.

8. A device according to claim 1, wherein the amount of fuel left in relation to the planned mission is presented in the form of a second bar.

9. A device according to claim 8, wherein the second bar is placed outside of the symbol and extends along a portion thereof.

10. A device according to claim 8, wherein the second bar has its zero point at the outer edge and extends in toward the symbol center when the fuel is not expected to suffice for the entire mission, and in the opposite direction when there is a surplus of fuel.

11. A method for displaying one or more detected threats in relation to an aircraft, wherein each and every one of the detected threats is represented as a threat marking on a display surface, wherein the aircraft is placed at a center surrounded by an outer edge, and where a direction to each threat is marked by the placement of the associated threat marking in relation to the outer edge, wherein:

each threat marking is represented by an indicator that extends from the outer edge in the direction toward the symbol center, wherein the length of the indicator is chosen so that the distance between the end of the indicator and the symbol center represents the time until the associated threat, and a current time discrepancy in relation to a planned mission and the remaining fuel left in relation to the planned mission are presented on a display surface.

* * * * *

UNITED STATES PATENT AND TRADEMARK OFFICE
CERTIFICATE OF CORRECTION

| | | |
|---|---|---|
| PATENT NO. | : 7,161,500 B2 | Page 1 of 1 |
| APPLICATION NO. | : 10/476893 | |
| DATED | : January 9, 2007 | |
| INVENTOR(S) | : Jens Alfredsson et al. | |

It is certified that error appears in the above-identified patent and that said Letters Patent is hereby corrected as shown below:

On the Title Page, Section (75) Inventors: please correct the name of inventor

"Örian Skinnars, Rimforsa (SE)" to the following:

-- Örjan Skinnars, Rimforsa (SE) --

Signed and Sealed this

Fourth Day of March, 2008

JON W. DUDAS
*Director of the United States Patent and Trademark Office*